United States Patent
Blondel et al.

(10) Patent No.: US 8,952,103 B2
(45) Date of Patent: *Feb. 10, 2015

(54) COPOLYMERS HAVING AMIDE UNITS AND ETHER UNITS WITH IMPROVED OPTICAL PROPERTIES

(75) Inventors: Philippe Blondel, Bernay (FR); Inci Turan, Val de Reuil (FR); Thibaut Montanari, Menneval (FR); Frederic Malet, Rouen (FR)

(73) Assignee: Arkema France, Colombes (FR)

( * ) Notice: Subject to any disclaimer, the term of this patent is extended or adjusted under 35 U.S.C. 154(b) by 456 days.

This patent is subject to a terminal disclaimer.

(21) Appl. No.: 12/302,668

(22) PCT Filed: Jun. 8, 2007

(86) PCT No.: PCT/FR2007/051390
§ 371 (c)(1),
(2), (4) Date: Nov. 26, 2008

(87) PCT Pub. No.: WO2008/006987
PCT Pub. Date: Jan. 17, 2008

(65) Prior Publication Data
US 2009/0264601 A1  Oct. 22, 2009

Related U.S. Application Data

(60) Provisional application No. 60/838,011, filed on Aug. 16, 2006.

(30) Foreign Application Priority Data

Jun. 14, 2006  (FR) ..................................... 06 05284

(51) Int. Cl.
*C08L 77/12* (2006.01)
*C08G 69/40* (2006.01)
(52) U.S. Cl.
CPC ..................................... *C08G 69/40* (2013.01)
USPC ........................................................ 525/408
(58) Field of Classification Search
USPC ........................................................ 525/408
See application file for complete search history.

(56) References Cited

U.S. PATENT DOCUMENTS

| 4,331,786 | A | * | 5/1982 | Foy et al. ....................... 525/408 |
| 4,429,081 | A | * | 1/1984 | Mumcu et al. ................ 525/420 |
| 5,360,891 | A | | 11/1994 | Wenzel et al. |
| 5,387,651 | A | | 2/1995 | Ciaperoni |
| 5,936,044 | A | | 8/1999 | Melot et al. |
| 2002/0063133 | A1 | | 5/2002 | Spickelmire et al. |
| 2002/0173596 | A1 | * | 11/2002 | Montanari et al. ............. 525/432 |
| 2002/0179888 | A1 | | 12/2002 | Montanari et al. |
| 2003/0065107 | A1 | | 4/2003 | Lacroix et al. |
| 2004/0048016 | A1 | | 3/2004 | Wang et al. |
| 2005/0165175 | A1 | | 7/2005 | Montanari et al. |
| 2006/0030692 | A1 | | 2/2006 | Montanari et al. |
| 2006/0217500 | A1 | | 9/2006 | Gaymans et al. |
| 2007/0128442 | A1 | | 6/2007 | Buehler |
| 2007/0179252 | A1 | | 8/2007 | Lamberts et al. |

FOREIGN PATENT DOCUMENTS

EP  628602  A1  *  12/1994

OTHER PUBLICATIONS

English translation of EP 0628602A1.*
English translation of EP 0628602, accessed Dec. 11, 2013.*

* cited by examiner

*Primary Examiner* — Alicia Bland
(74) *Attorney, Agent, or Firm* — RatnerPrestia

(57) ABSTRACT

The present invention is a copolymer based on amide units and ether units, wherein the amide units being comprise a major portion of an equimolar combination of at least one diamine and at least one dicarboxylic acid, the diamine(s) is/are mainly cycloaliphatic and the dicarboxylic acid(s) is/are mainly linear and aliphatic, the amide units optionally comprise, but in a minor proportion, at least one other polyamide comonomer, the respective proportions of ether and amide unit monomers are selected in such a way that said copolymer is highly transparent to such an extent that the transmittance at 560 nm on a plate 2 mm thick is greater than 75%; the crystallinity of said copolymer is such that the enthalpy of fusion during the first heating of a ISO DSC (delta Hm(2)) is at least 30 J/g, where the mass is related to the number of amide units contained or of polyamide contained, which fusion corresponds to that of the amide units; and said copolymer has a glass transition temperature of at least 75° C.

26 Claims, No Drawings

COPOLYMERS HAVING AMIDE UNITS AND ETHER UNITS WITH IMPROVED OPTICAL PROPERTIES

PRIORITY CLAIM

This application claims benefit, under U.S.C. §119 or §365 of French Application Number FR 0605284, filed Jun. 14, 2006; U.S. 60/838,011, filed Aug. 16, 2006; and PCT/FR2007/051390 filed Jun. 8, 2007.

FIELD OF THE INVENTION

The present invention relates to novel copolymers based on amide units and on polyether units, these copolymers being typically transparent and being amorphous or exhibiting a crystallinity ranging from a "very slight semicrystallinity" to an "intermediate crystallinity".

BACKGROUND OF THE INVENTION

In order to better characterize the invention and the problem which it solves, five categories of existing polyamide materials will be mentioned. The term "polyamide materials" is understood to mean compositions based on polyamides, copolyamides and polyamide alloys or based on polyamides.

(1) Impact-Modified Polyamide Materials (High-Impact PA)

These are alloys of polyamide with a minor amount of elastomer, typically in the vicinity of 20% by weight. The polyamide is typically a semicrystalline polyamide. These alloys have the advantage of a very good impact strength, much improved with respect to polyamide alone, typically three times better or more. They also have good chemical resistance and satisfactory resistance to distortion under heat (60° C.). They have the disadvantage of being opaque, which can be a problem for decorative components. A well-known example of high-impact polyamide is "Zytel ST801" from DuPont.

(2) Transparent Amorphous Polyamide Materials (TR amPA)

These are materials which are transparent, which are amorphous or not very semicrystalline (enthalpy of fusion during the DSC second heating of less than 30 J/g), which are rigid (flexural modulus ISO>1300 MPa) and which do not distort under heat, at 60° C., as they have a glass transition temperature Tg of greater than 75° C. However, they are rather unresistant to impacts, exhibiting a much lower notched Charpy ISO impact in comparison with impact-modified polyamides, and their chemical resistance is not excellent, in particular due to their amorphous nature. There also exists (but these are materials less frequently encountered) transparent semicrystalline (or microcrystalline) polyamides, typically with enthalpies of fusion during the DSC second heating between 2 and 30 J/g, these materials also being fairly rigid and having a flexural modulus ISO>1000 MPa.

(3) Polyether-Block-Amide and Copolymers Comprising Ether and Amide Units (PEBA)

These are copolyamides based on ether units and on amide units, polyetheramides and in particular polyether-block-amides (PEBAs). These are very flexible highly impact-resistant materials but with a fairly low transparency (45 to 65% of light transmission at 560 nm for a thickness of 2 mm), just like their polyamide homologues without ether units.

(4) Semicrystalline Polyamides (PA)

These are typically linear aliphatic polyamides. Their crystallinity is reflected by the presence of spherolites, the size of which is sufficiently great for the material not to be highly transparent (light transmission of less than 75%).

(5) Transparent Semicrystalline Polyamides (TR scPA)

These are more specifically microcrystalline polyamides where the size of the spherolites is sufficiently small to retain the transparency; (see European Patents EP 550 308 and EP 725 101) (transparency>75%).

The various properties of the five categories of polyamides which have just been indicated have been summarized in Table 1A below:

TABLE 1A

| Polyamide category | Transparency (a) | Impact/breaking strength (b) | Flexibility c) | Temperature stability (d) | Chemical resistance (e) | Elastic fatigue (f) | Processing (g) |
|---|---|---|---|---|---|---|---|
| (1) High-impact PA | --- | +++ | + | ++ | +++ | + | +++ |
| (2) TR amPA[(1)] | +++ | – | – to --- | ++ to +++ | – to --- | -- to + | – |
| (3) PEBA[(2)] | -- to + | + to +++ | + to +++ | + to ++ | + to ++ | +++ | ++ to +++ |
| (4) PA | -- to – | + | + | ++ | +++ | + | +++ |
| (5) TR scPA | ++ to +++ | + | – to + | – to + | + to +++ | – to + | – |

Grades from --- = very bad to +++ = very good

DEFINITIONS OF TABLE 1A (a) Transparency: is characterized by the measurement of transmission at 560 nm through a polished sheet with a thickness of 2 mm.
(b) Impact/breaking strength: is characterized by a rapid folding test or by a notched Charpy impact ISO179.
(c) Flexibility: is characterized by the flexural modulus ISO178.
(d) Temperature stability: ability of the polyamide not to be distorted if it is placed in a hot atmosphere, at approximately 60° C., and under the effect of a relatively great weight.
(e) Chemical resistance: ability of the polyamide not to be damaged (matifying, cracking, splitting, breaking) on contact with a chemical (alcohol, and the like) and in particular if it is placed under stress, that is to say "stress cracking".
(f) Elastic fatigue: ability of the polyamide to be folded a large number of times without breaking, elastic rebound, for example "Ross-Flex" test.
(g) Processing: ability of the polyamide to be easily processed by an injection-moulding process (short cycle time, easy removal from the mould, undistorted component).

The aim of the invention is to find novel transparent compositions which are impact resistant, which are not too rigid and even up to very flexible, which behave well towards or are resistant to distortion under heat (60° C.) and/or which have good chemical resistance. The ability to withstand alternating bending (fatigue) and the ability to be easily processed by injection-moulding are also qualities which may be looked for. In other words, the aim has been to find a composition combining most of, or at least a larger number of, the advantages of the first three categories above (high-impact PA, TR amPA, PEBA).

The PEBA copolymers belong to the specific category of the polyetheresteramides when they result from the copolycondensation of polyamide sequences comprising reactive carboxyl ends with polyether sequences comprising reactive ends, which are polyether polyols (polyether diols), the bonds between the polyamide blocks and the polyether blocks being ester bonds, or alternatively to the category of the polyetheramides when the polyether sequences comprise amine ends.

Various PEBAs are known for their physical properties, such as their flexibility, their impact strength or their ease of processing by injection-moulding.

The improvement in the transparency of PEBAs has already formed the subject of various research studies.

French Patent FR 2 846 332 discloses the use of PEBAs in which the polyamide block is a microcrystalline copolyamide immiscible with the polyether block. In particular, Example 1 describes a polyamide based on Jun. 11, 1912, which is regulated with adipic acid and which is coupled with polytetramethylene glycol (abbreviated to PTMG). However, these copolymers have a glass transition temperature Tg of approximately 70° C. For this reason, this copolymer softens and distorts excessively as soon as the temperature approaches the Tg, from approximately 60° C., which is frequently encountered under the conditions of normal life of the product, for example under a motor vehicle windscreen or inside a container right in the sun. Furthermore, this copolymer does not comprise a cycloaliphatic unit.

Generally, known copolymers comprising ether and amide units are composed of semicrystalline and linear aliphatic polyamide sequences (for example, the "Pebax" products from Arkema, or the "Vestamid E" products from Degussa).

The Applicant Company has discovered, surprisingly, that if, on the contrary, use is made of polyamide monomers of cycloaliphatic and thus nonlinear aliphatic nature and if they are copolymerized with polyethers, transparent and amorphous or only very slightly semicrystalline copolymers are obtained. What is more, materials which are resistant to distortion under heat at 60° C. (as the glass transition temperature Tg is greater than or equal to 75° C.) and which have very good impact strength and good flexibility are obtained.

SUMMARY OF THE INVENTION

The subject-matter of the present invention is thus a copolymer based on amide units and on ether units, the amide units being composed predominantly of an equimolar combination of at least one diamine and of at least one dicarboxylic acid, the diamine or diamines being predominantly cycloaliphatic and the dicarboxylic acid or acids being predominantly linear aliphatic, it being possible for the amide units optionally to comprise, but to a minor extent, at least one other polyamide comonomer, the respective proportions of monomers of the ether and amide units being chosen so that:
  the said copolymer exhibits a high transparency which is such that the transmission at 560 nm through a sheet with a thickness of 2 mm is greater than 75%;
  the said copolymer is amorphous or exhibits a crystallinity such that the enthalpy of fusion (delta Hm(2)) during the second heating of an ISO DSC is at most equal to 30 J/g, the weight being with respect to the amount of amide units present or of polyamide present, this melting corresponding to that of the amide units;
  the said copolymer has a glass transition temperature at least equal to 75° C.

DETAILED DESCRIPTION OF THE INVENTION

The term "predominantly" is understood to mean "in a proportion of more than 50% by weight (>50%)".

The expression "to a minor extent" is understood to mean "in a proportion of less than 50% by weight (<50%)".

The term "delta Hm(2)" is understood to mean the enthalpy of fusion during the second heating of a DSC according to the ISO standard, DSC being Differential Scanning Calorimetry.

The cycloaliphatic diamine or diamines according to the present invention are advantageously chosen from bis(3-methyl-4-aminocyclohexyl)methane (BMACM), para-aminodicyclohexylmethane (PACM), isophoronediamine (IPD), bis(4-amino-cyclohexyl)methane (BACM), 2,2-bis(3-methyl-4-aminocyclohexyl)propane (BMACP) or 2,6-bis(aminomethyl)norbornane (BAMN).

Advantageously, just one cycloaliphatic diamine, in particular bis(3-methyl-4-aminocyclohexyl)methane, was used as diamine to produce the amide units.

At least one noncycloaliphatic diamine can participate in the composition of the monomers of the amide units, in a proportion of at most 30 mol % with respect to the diamines of the said composition. Mention may be made, as noncycloaliphatic diamine, of linear aliphatic diamines, such as 1,4-tetramethylenediamine, 1,6-hexamethylenediamine, 1,9-nonamethylenediamine and 1,10-decamethylenediamine.

The aliphatic dicarboxylic acid or acids can be chosen from aliphatic dicarboxylic acids having from 6 to 36 carbon atoms, preferably from 9 to 18 carbon atoms, in particular 1,10-decanedicarboxylic acid (sebacic acid), 1,12-dodecanedicarboxylic acid, 1,14-tetradecanedicarboxylic acid and 1,18-octadecanedicarboxylic acid.

At least one nonaliphatic dicarboxylic acid can participate in the composition of the monomers of the amide units in a proportion of at most 15 mol % with respect to the dicarboxylic acids of the said composition. Preferably, the nonaliphatic dicarboxylic acid is chosen from aromatic diacids, in particular isophthalic acid (I), terephthalic acid (T) and their mixtures.

The lactam is, for example, chosen from caprolactam, oenantholactam and lauryllactam.

The α,ω-aminocarboxylic acid is, for example, chosen from aminocaproic acid, 7-aminoheptanoic acid, 11-aminoundecanoic acid or 12-aminododecanoic acid.

Advantageously, the PA blocks represent 50 to 95% by weight of the said copolymer.

The PA blocks are, for example, chosen from: BMACM.9, BMACM.10, BMACM.12, BMACM.14, BMACM.18 and their mixtures.

The number-average molecular weight of the PA blocks is advantageously between 500 and 12 000 g/mol, preferably between 2000 and 6000 g/mol.

The PE (polyether) blocks result, for example, from at least one polyalkylene ether polyol, in particular a polyalkylene ether diol, preferably chosen from polyethylene glycol (PEG), polypropylene glycol (PPG), polytrimethylene glycol (PO3G), polytetramethylene glycol (PTMG) and their blends or their copolymers.

The PE blocks can comprise polyoxyalkylene sequences comprising $NH_2$ chain ends, it being possible for such sequences to be obtained by cyanoacetylation of α,ω-dihydroxylated aliphatic polyoxyalkylene sequences, referred to as polyether diols. More particularly, use may be made of Jeffamines (for example Jeffamine® D400, D2000, ED 2003 or XTJ 542, commercial products from Huntsman. See also Patents JP 2004346274, JP 2004352794 and EP 1 482 011).

The number-average molecular weight of the PE blocks is advantageously between 200 and 4000 g/mol, preferably between 300 and 1100 g/mol.

The copolymer according to the invention can be amorphous or can have a crystallinity such that delta Hm(2) of the said copolymer is less than or equal to 10 J/g.

The copolymer according to the invention can also exhibit an intermediate crystallinity such that delta Hm(2) of the said copolymer is between 10 and 30 J/g, preferably between 10 and 25 J/g, the weight being with respect to the amount of amide units present or of polyamide present, this melting corresponding to that of the amide units. Such materials are products with behaviour intermediate between amorphous or essentially amorphous polymers, that is to say with an enthalpy of fusion of the second heating between 0 and 10 J/g, which are no longer in the solid state above their Tg, and truly semicrystalline polymers, which are polymers which remain in the solid state and thus which definitely retain their shape above their Tg. These products with intermediate behaviour are thus in a more or less solid state but can be easily deformed above their Tg. As their Tg is high, in so far as they are not used above this Tg, such materials are advantageous, all the more so as their chemical resistance is better than that of the amorphous materials. Example 32 of the present application illustrates such materials with intermediate behaviour.

The copolymer according to the present invention can advantageously be transparent with more than 75% of transmission at 550 nm through a thickness of 2 mm.

The copolymer according to the present invention can in addition advantageously comprise at least one additive chosen from heat stabilizers, UV stabilizers, colorants, nucleating agents, plasticizers or agents for improving the impact strength, the said additive or additives preferably having a refractive index similar to that of the said copolymer.

A specific form of the present invention consists in choosing a copolymer characterized in that its flexible ether units are chosen to be of highly hydrophilic nature, preferably of polyether block of PEG, PPG or PO3G type nature, which confers an advantageous increase in antistatic properties and waterproof-breathable (that is to say, allowing the passage of water vapour but not of liquid water) properties on the composition. Furthermore, this composition can be additivated by third-party antistatic additives, in order to strengthen the overall antistatic effect, and also by additives which make it possible to increase the blending compatibility with other polymers. The copolymer, alone or thus additivated, can subsequently be used as additive of another polymer or material in order to confer, on the latter, an increase in antistatic or waterproof-breathable properties.

Another subject-matter of the present invention is a process for the preparation of a copolymer as defined above, characterized in that:
 in a first stage, the polyamide PA blocks are prepared by polycondensation
  of the diamine or diamines;
  of the dicarboxylic acid or acids; and
  if appropriate, of the comonomer or comonomers chosen from lactams and α,ω-aminocarboxylic acids;
  in the presence of a chain-limiting agent chosen from dicarboxylic acids; then
 in a second stage, the polyamide PA blocks obtained are reacted with polyether PE blocks in the presence of a catalyst.

The general method for the two-stage preparation of the copolymers of the invention is known and is disclosed, for example, in French Patent FR 2 846 332 and European Patent EP 1 482 011.

The reaction for the formation of the PA block is usually carried out between 180 and 300° C., preferably from 200 to 290° C., the pressure in the reactor is established between 5 and 30 bar and is maintained for approximately 2 to 3 hours. The pressure is slowly reduced by bringing the reactor to atmospheric pressure and then the excess water is distilled off, for example over one or two hours.

The polyamide comprising carboxylic acid ends having been prepared, the polyether and a catalyst are subsequently added. The polyether can be added on one or more occasions, and likewise for the catalyst. According to an advantageous form, first of all the polyether is added and the reaction of the OH ends of the polyether and of the COOH ends of the polyamide begins with formation of ester bonds and removal of water. As much as possible of the water is removed from the reaction medium by distillation and then the catalyst is introduced in order to bring to completion the bonding of the polyamide blocks and of the polyether blocks. This second stage is carried out with stirring, preferably under a vacuum of at least 15 mmHg (2000 Pa), at a temperature such that the reactants and the copolymers obtained are in the molten state. By way of example, this temperature can be between 100 and 400° C. and generally 200 and 300° C. The reaction is monitored by measuring the torsional couple exerted by the molten polymer on the stirrer or by measuring the electrical power consumed by the stirrer. The end of the reaction is determined by the target value of the couple or of the power.

It is also possible to add, during the synthesis, at the moment judged the most opportune, one or more molecules used as antioxidant, for example Irganox®11010 or Irganox® 245.

Another subject-matter of the present invention is a process for the preparation of a copolymer as defined above, characterized in that all the monomers are added at the start, i.e. in a single stage, to carry out the polycondensation:
 of the diamine or diamines;
 of the dicarboxylic acid or acids; and
 if appropriate, of the other polyamide comonomer or comonomers;
 in the presence of a chain-limiting agent chosen from dicarboxylic acids;
 in the presence of the PE (polyether) blocks;
 in the presence of a catalyst for the reaction between the PE blocks and the PA blocks.

Advantageously, the said dicarboxylic acid, which is introduced in excess with respect to the stoichiometry of the diamine or diamines, is used as chain-limiting agent.

Advantageously, a derivative of a metal chosen from the group formed by titanium, zirconium and hafnium or a strong acid, such as phosphoric acid, hypophosphorous acid or boric acid, is used as catalyst.

The polycondensation can be carried out at a temperature of 240 to 280° C.

Another subject-matter of the present invention is a shaped article, in particular a transparent or translucent shaped article, such as fibre, fabric, film, sheet, rod, pipe or injection-moulded component, comprising the copolymer as defined above, or manufactured by a process as defined above.

Thus, the copolymer according to the present invention is advantageous in the ready manufacture of articles, in particular of sports equipment or components of sports equipment, which have in particular to simultaneously exhibit good transparency, good impact strength and good endurance with regard to mechanical assaults and attacks by chemicals, UV radiation and heat. Mention may be made, among this sports equipment, of components of sports shoes, sports gear, such as ice skates or other winter and mountaineering sports equipment, ski bindings, rackets, sports bats, boards, horseshoes, flippers, golf balls or recreational vehicles, in particular those intended for cold-weather activities.

Mention may also be made generally of recreational equipment, do-it-yourself equipment, highway gear and equipment subjected to attacks by the weather and to mechanical assaults, and protective articles, such as helmet visors, glasses and sides of glasses. Mention may also be made, as nonlimiting examples, of motor vehicle components, such as headlight protectors, rearview mirrors, small components of all-terrain motor vehicles, tanks, in particular for mopeds, motorbikes or scooters, subjected to mechanical assaults and attacks by chemicals, cosmetic articles subjected to mechanical assaults and attacks by chemicals, lipstick tubes, pressure gauges or attractive protective components, such as gas bottles. Furthermore, as regards the field of screws and bolts, as PMMA is particularly weak, it is difficult to screw it on. A transparent screw in a fairly soft material will be capable of preventing the PMMA from breaking when overdoing it in screwing it on.

The following examples illustrate the present invention without, however, limiting the scope thereof.

In these examples, the percentages are by weight, unless otherwise indicated, and the following abbreviations were used:

BMACM: 3,3'-dimethyl-4,4'-diaminodicyclohexyl-methane.
PACM: 4,4'-diaminodicyclohexylmethane, which is found with variable ratios of isomers; it is thus possible to distinguish "PACM20" from Air Products and PACM richer in trans-trans isomer, Dicycan from BASF, which comprises more than 45% of trans-trans isomer and which will be referred to as "PACM45".
TA: terephthalic acid.
IA: isophthalic acid.
C14: tetradecanedioic acid.
C12: dodecanedioic acid.
C10: sebacic acid.
C6: adipic acid.
PTMG: a polyether, namely polytetramethylene glycol.
PEG: polyethylene glycol.
PE: polyether.

In the case of diacid mixture, their proportions are indicated in moles (see Table 2).

Copolymers were prepared according to the following procedure:

Comparative Examples 1 to 3 of Transparent Polyamides (see Table 2 below
General Procedure:
PAs based on cycloaliphatic diamine were prepared in 1 stage according to the following procedure:
The various monomers, plus 3% of water, were charged to an 80 l autoclave. The reactor, closed and purged with nitrogen, was heated to 270° C. under pressure and while stirring at 40 rpm. Conditions were maintained for 3 hours, then the pressure was reduced to atmospheric pressure over two hours and the polycondensation was continued under nitrogen at 280° C. (indeed even 300° C.) for approximately 2 hours in order to achieve the desired viscosity. The products were granulated. The 25 kg of polymer obtained were dried at 90° C. under vacuum.

Comparative Example 4

This is Example 1 described in French Patent FR 2 846 332, having PA 6/11/12 blocks and PTMG blocks.

Examples 6 to 10 According to the Invention (see Tables 1B and 2 below)
General Procedure:
PEBAs were prepared in 2 stages from PA blocks based on cycloaliphatic diamine according to the following procedure:
Cycloaliphatic diamine and diacids were charged to an 80 l autoclave. The reactor, purged with nitrogen and closed, was heated to 260° C. under pressure and while stirring at 40 rpm. After maintaining for one hour, the pressure was reduced under atmospheric pressure and the polyether and the catalyst were added. The reactor was placed under vacuum over 30 minutes in order to reach 5 kPa (50 mbar) (if necessary 2 kPa (20 mbar)). The rise in the couple lasted approximately two hours. On achieving the viscosity, the reactor was brought back to atmospheric pressure and the product was granulated and dried under vacuum at 75° C.

TABLE 1B

| Monomer or starting material | Example 6 Amounts charged (kg) | Example 7 Amounts charged (kg) | Example 8 Amounts charged (kg) | Example 9 Amounts charged (kg) | Example 10 Amounts charged (kg) |
|---|---|---|---|---|---|
| BMACM | 16.446 | 16.446 | 14.313 | 11.805 | 13.309 |
| C10 Sebacic acid | 15.085 | 6.967 | | | |
| C14 Tetradecanedioic acid | | | 17.039 | 8.126 | 8.117 |
| Dodecanedioic acid | | 9.27 | | 7.135 | 7.160 |
| PTMG 650 | 3.51 | 3.51 | 3.707 | 8.066 | |
| PTMG 1000 | | | | | 6.470 |
| Water | 0.5 | 0.5 | 0.5 | 0.5 | 0.5 |
| Zirconium butoxide (g) | 45.5 | 45.5 | 45.5 | 45.5 | 45.5 |

For the other examples, the procedure is similar, as described in Table 3, in 1 stage or in 2 stages, as the case may be, the percentage of PE is expressed by weight, the Mn weights of the PA and PE units are shown ("Mn PE", and "Mn PA" columns), the composition of the PA being described in moles ("diamine", "diacid" columns, expressed in moles).

Examples 11 to 32

(see Table 3 below)
General Procedure:

PEBAs were prepared according to the following procedure. All the monomers were introduced into a glass reactor immersed in an oil bath and equipped with a stirrer. The mixture of approximately 60 g of cycloaliphatic diamine, of diacid and of polyethers thus formed was placed under an inert atmosphere and heated until the temperature reached 260° C. After polycondensing under nitrogen for approximately 1 hour, the catalyst $Zr(OBu)_4$ was added and the reactor was placed under vacuum (1 kPa to 5 kPa (10 to 50 mbar)) in order to bring the polymerization to an end at 260° C. Once the viscosity was reached, the reactor was again placed under nitrogen and cooled.

Example 11

The following were charged in one stage: 27.1 g of BMACM, 13.5 g of C10 diacid, 13.1 g of C12 diacid and 6.4 g of PTMG 650. The addition of the catalyst $Zr(OBu)_4$ is 0.4 ml. The chain-limiting agent is the C10 diacid. The C10/C12 molar ratio is 50/50.

For the copolymers of Examples 1 to 10, sheets of 100×100×2 mm were moulded by injection-moulding the said copolymers at 270° C. with a cold mould at 10° C.

For the copolymers of Examples 11 to 32, pellets were prepared by compressing at 270° C. under a press.

The optical and mechanical properties of these sheets or pellets were measured (see Tables 2 and 3).

DEFINITIONS OF TABLES 2 AND 3 h) Rise in viscosity: It represents the ability to be polymerized and consequently to produce a polymer of sufficient weight and thus of sufficient viscosity, which is reflected by an increase in the couple or in the power of the stirrer motor of the polymerizer. This rise in viscosity is produced under nitrogen or under vacuum. This rise in viscosity may be possible (recorded as "yes" in the tables which follow) or may not be possible (recorded as "no" in the tables which follow).
i) Tg: Inflection point ("Midpoint") at the second pass by DSC, which is Differential Scanning Calorimetry ISO 11357.
i) Transparency: the transmission of the light at 560 nm is measured on sheets with a thickness of 2 mm. "VG" means that the transmission is >85%; "G" means that the transmission is >80% and "FG" means that the transmission is >75%.
k) Opacity—Transparency: corresponds to the contrast ratio and percentage of light transmitted or reflected at the wavelength of 560 nm on a sheet with a thickness of 2 mm.
l) MFI (melt flow index), measured at 275° C., 2.16 kg: The higher the MFI, the easier the synthesis of the copolymer.
m) Stiffness (flexibility): It is characterized by the measurement of the flexural modulus on a bar of 80×10×4 mm according to Standard ISO178. It is also characterized by the measurement of the E' modulus obtained during a DMA test, which is a Differential Mechanical Analysis ISO 6721.
n) Elasticity and fatigue: The coefficient α (alpha) is determined graphically during an analysis of responsiveness (amplitude as a function of time). The higher the value, the more responsive and elastic the material. The fatigue behaviour is characterized by a Ross-Flex test ASTM1052 at −10° C. on an unpierced test specimen which is bent alternately by 90°. The number of cycles withstood before breaking is measured.
o) Elongation at break (%): The tension is measured on a test specimen of dumbbell type according to Standard ISOR527.
p) Viscosity: The intrinsic viscosity in dl/g is measured from 0.5 g of product dissolved at 25° C. in metacresol.
q) Yellowing: The yellow index is measured on granules (Table 2) or is estimated qualitatively (Table 3): "0" corresponds to no yellowing, "+" to slight yellowing, "++" to significant yellowing.
r) Semicrystalline: A semicrystalline polymer, in particular a polyamide, is a polymer which has a melting point with a significant enthalpy of fusion (recorded as delta Hm(2)), of greater than 10 J/g, preferably of greater than 25 j/g (measurement carried out during an ISO DSC, during the second heating), which means that the polymer retains an essentially solid state above its glass transition temperature (Tg).
s) Amorphous: An amorphous polymer, in particular a polyamide, is a polymer which does not have a melting point or which has a not very marked melting point, that is to say with an enthalpy of fusion of less than 10 J/g, measurement carried out during an ISO DSC, during the second heating. This polymer thus leaves its solid state above its glass transition temperature (Tg).
t) Antistatic effects: The antistatic effect is characterized by measurement of surface resistivity (ohm) according to ASTM D257 at 20° C. at a relative humidity of 65% under a continuous voltage of 100 V.
u) Waterproofness-breathability or permeability to water vapour: It is estimated according to Standard ASTM 96 E BW at 38° C. and 50% relative humidity on a film with a thickness of 25 μm.
v) Impact strength/bending test. The test is carried out in the following way. 80×10×4 mm bars are moulded by injection moulding in an ISO mould. The bar is bent rapidly by 180° at the injection gate, between the bar and the cluster, at the point where the thickness is reduced to approximately 1 mm. The number of clean breakages is subsequently measured over a series of 20 bars and is expressed as percentage of breakage.

The chemical resistance was also tested and showed a 100% resistance in ethanol and in acetone for the copolymer of Example 7.

These tests show that the copolymers of the present invention can be as transparent as the polyamides of the prior state of the art while having greater flexibility.

Example 32 constitutes a particular advantageous case. It is characterized in that the flexible ether units are chosen to be of highly hydrophilic nature, which confers antistatic and waterproof-breathable (that is to say, allowing the passage of water vapour but not of liquid water) properties on the composition. Furthermore, this composition can be additivated by third-party antistatic additives, in order to reinforce the overall antistatic effect, and by additives which make it possible to increase the blending compatibility with other polymers, it being possible for the copolymer, alone or thus additivated, subsequently to be specifically used as additive of another polymer or material in order to confer on it an improvement in its antistatic or waterproof-breathable properties. If the additivated polymer is transparent, then, advantageously, the PA monomers (and other additives) will be chosen so that the refractive index of our copolymer (optionally itself additivated) is very close to that of the additivated polymer.

TABLE 2

Comparative Examples 1-4 and Examples 6-10

| Example | Stage(s) | Diamine (of the PA) (1 mol) | Diacid (of the PA) (in mol) | PE | % PE (weight) | Mn of the PA | Mn of the PE | Rise in viscosity | Tg (° C.) | Delta Hm(2) | Transparency |
|---|---|---|---|---|---|---|---|---|---|---|---|
| Comp. 1 | 1 | BMACM | C14 | — | 0.00 | | 0 | yes | 144 | 0 | 91 |
| Comp. 2 | 1 | PACM 20 | C14 | — | 0.00 | | 0 | yes | 125 | 0 | 90 |
| Comp. 3 | 1 | BMACM | C12 | — | 0.00 | | 0 | yes | 152 | 0 | 91 |
| Comp. 4 | 1 | PA 6/11/12 | | PTMG | 0.14 | 4000 | 650 | yes | 70 | | 78 |
| 6 | 2 | BMACM | C10 | PTMG | 0.12 | 5000 | 650 | yes | 131 | 4 | 86 |
| 7 | 2 | BMACM | C10 (0.5), C12 (0.5) | PTMG | 0.12 | 5000 | 650 | yes | 131 | 0 | 90 |
| 8 | 2 | BMACM | C14 | PTMG | 0.12 | 5000 | 650 | yes | 108 | 0 | 92 |
| 9 | 2 | BMACM | C12(0.5), C14 (0.5) | PTMG | 0.25 | 2000 | 650 | yes | 91 | 0 | 91 |
| 10 | 2 | BMACM | C12(0.5)-C14 (0.5) | PTMG | 0.20 | 4000 | 1000 | yes | 112 | 0 | 86 |

| Example | MFI | Opacity | Flexural modulus (MPa) | α (alpha) | Ross-Flex | Elongation at break (%) | Yield stress (MPa) | Viscosity | Yellowing | Impact strength/ bending |
|---|---|---|---|---|---|---|---|---|---|---|
| Comp. 1 | 6.5 | 12.4 | 1382 | 7.5 | <10 000 | 190 | 51 | 1.17 | | 40% |
| Comp. 2 | 18 | 9.7 | 1384 | | | 199 | 52 | | | |
| Comp. 3 | 6 | 10.1 | 1491 | 8.4 | | 182 | 55 | 1.09 | | 50% |
| Comp. 4 | | 13 | | | | | | | | |
| 6 | 13 | 10.6 | 1455 | 10.2 | | 202 | 50 | 1.18 | | 0% |
| 7 | 11 | 9.6 | 1377 | 8.9 | | 221 | 48 | 1.21 | | 0% |
| 8 | | | 1190 | | | 260 | 43 | 1.11 | 13.7 | 0% |
| 9 | | | 680 | | 50 000 | | | 1.21 | 8.7 | 0% |
| 10 | | | 970 | | | 290 | 35 | 1.21 | 0.25 | 0% |

NB: the compositions of the "Diacid" column are given in moles. For example, Example 7 means: 12% by weight of PTMG with an Mn weight of 650 g and the remainder of PA, the latter having the composition: 1 mol of BMACM, 0.5 mol of C10 and 0.5 mol of C12. The weight of the PA is to be understood at within ±5% and it can be adjusted within this range in order to obtain an even better rise in viscosity.

TABLE 3

| Ex. | Stage(s) | Diamine (of the PA) | Diacid (of the PA) | PE | % PE | MnPA | MnPE | Rise in viscosity | Tg (° C.) by DSC |
|---|---|---|---|---|---|---|---|---|---|

Examples 11-26 and Comparative Example 17

| 11 | 1 | BMACM | C10 (0.5), C12 (0.5) | PTMG | 11.5 | 5000 | 650 | yes | 118 |
| 12 | 1 | BMACM | C9 | PTMG | 11.5 | 5000 | 650 | yes | 129 |
| 13 | 1 | BMACM | C10 (0.5), C12 (0.5) | PTMG | 14 | 4000 | 650 | yes | 111 |
| 14 | 1 | BMACM | C10 (0.5), C12 (0.5) | PTMG | 16.7 | 5000 | 1000 | yes | 127 |
| 15 | 1 | BMACM | C10 (0.5), C12 (0.5) | PTMG | 17.8 | 3000 | 650 | yes | 100 |
| 16 | 1 | BMACM | C10 (0.5), C12 (0.5) | PTMG | 17.8 | 3000 | 650 | yes | 108 |
| Comp. 17 | 1 | BMACM | C6 | PTMG | 11.5 | 5000 | 650 | no | 110 |
| 18 | 1 | BMACM | C14 | PTMG | 11.5 | 5000 | 650 | yes | 107 |
| 19 | 1 | BMACM | C18 | PTMG | 13.9 | 4000 | 650 | yes | 80 |
| 20 | 1 | BMACM | C14 (0.5), C18 (0.5) | PTMG | 17.8 | 3000 | 650 | yes | 86 |
| 21 | I | BMACM | C14 (0.5), C18 (0.5) | PTMG | 17.8 | 3000 | 650 | yes | 88 |
| 22 | 1 | BMACM | C14 (0.5), C18 (0.5) | PTMG | 24.5 | 2000 | 650 | yes | 75 |
| 23 | 1 | BMACM | C14 (0.5), C18 (0.5) | PTMG | 33.3 | 2000 | 1000 | yes | 85 |
| 24 | 1 | BMACM | C14 (0.5), C18 (0.5) | Jeffamine | 16.7 | 5000 | 1000 | yes | 122 |
| 25 | 1 | BMACM | C14 (0.8), C6(0.2) | PTMG | 16.7 | 5000 | 650 | yes | 111 |
| 26 | 1 | BMACM | C14 (0.85), IA (0.15) | PTMG | 16.7 | 5000 | 650 | yes | 119 |

Examples 27-32

| 27 | 1 | BMACM | C10(0.5), C14 (0.5) | PTMG | 0.2 | 4000 | 1000 | yes | 118 |
| 28 | 1 | BMACM | C12 (0.5), C14 (0.5) | PTMG | 0.245 | 2000 | 650 | yes | 91 |

TABLE 3-continued

| | | | | | | | | | |
|---|---|---|---|---|---|---|---|---|---|
| 29 | 1 | BMACM | C12 (0.5), C14 (0.5) | PTMG | 0.2 | 4000 | 1000 | yes | 104 |
| 30 | 1 | IPD | C10 (0.5), C14 (0.5) | PTMG | 0.115 | 5000 | 650 | yes | 105 |
| 31 | 1 | PACM45 | C14 | PTMG | 0.115 | 5000 | 650 | yes | 102 |
| 32 | 1 | BMACM | C14 (0.5), C18 (0.5) | PEG | 0.23 | 5000 | 1500 | yes | 85 |

| Ex. | Delta Hm(2) | Appearance, transparency | Rigidity E' modulus at 20° C. by DMA | Tangent delta of the DMA | Viscosity | Yellowing | Surface resistivity | Permeability water vapour |
|---|---|---|---|---|---|---|---|---|
| Examples 11-26 and Comparative Example 17 | | | | | | | | |
| 11 | 0 | VG | 1260 | 127 | 1.03 | + | | |
| 12 | 0 | G | | | 1.02 | ++ | | |
| 13 | 0 | VG | | | 1.02 | + | | |
| 14 | 0 | G | | | 0.93 | 0 | | |
| 15 | 0 | VG | 1125 | 120 | 0.88 | / | | |
| 16 | 0 | VG | 766 | 97 | 1.15 | / | | |
| Comp. 17 | 0 | opaque | | | / | / | | |
| 18 | 0 | VG | 1000 | 117 | 1.14 | + | $5 \times 10^{13}$ | 450 |
| 19 | 0 | VG | | | 0.88 | + | | |
| 20 | 0 | VG | | | 0.75 | + | | |
| 21 | 0 | VG | | | 1.15 | + | | |
| 22 | 0 | VG | 560 | 89 | 1.22 | + | | |
| 23 | 0 | VG | 410 | 111 | 1.34 | + | | |
| 24 | 0 | VG | | | 1.23 | + | | |
| 25 | 0 | FG | | | 0.74 | + | | |
| 26 | 0 | VG | 1130 | 123 | 0.87 | ++ | | |
| Examples 27-32 | | | | | | | | |
| 27 | 0 | FG | 886 | 121 | 1.33 | + | | |
| 28 | 0 | VG | 684 | 97 | 1.31 | + | | |
| 29 | 0 | G | 845 | 121 | 1.34 | + | | |
| 30 | 0 | G | | | 1.10 | + | | |
| 31 | 22 | G | | | 1.15 | + | | |
| 32 | 0 | FG | | | | | $4 \times 10^{10}$ | 7300 |

Application: Frames for Glasses

Frames for glasses were moulded (Frame 1 and Frame 2) using some of the copolymers produced above. The properties of the products obtained are presented in Table 4 below.

TABLE 4

| Frame | 1 | 2 |
|---|---|---|
| Material (Example) | Comp. 3 | Example 7 |
| Temperature of the mould (° C.) | 90 | 70 |
| Temperature of the material (° C.) | 290 | 275 |
| Maintenance time (s) | 6 | 4 |
| Cooling time (s) | 8 | 8 |
| Cycle time (s) | 15 | 13 |
| Presence of bubbles | yes | no |
| Appearance | | good, slight yellowing |
| Feel | soft | very soft |

Tests were also carried out to evaluate the impact strength of the copolymers of the invention. 80×10×4 mm bars were moulded by injection moulding from materials of Table 1. Series of 16 bars were bent on clusters to measure the number of broken bars. A test was developed from clusters of 80×10×4 bars manufactured using some of the copolymers produced above: the bars are bent by 180° at their injection point (at the point where the thickness reduces in the form of an indentation) and the percentage of breakage is recorded. The results are presented in Table 5 below, in %.

TABLE 5

| Bar | % of unbroken |
|---|---|
| Comp. 3 | 50 to 60% |
| Example 7 | 100% |

These results show that the copolymers of the invention make it possible to simultaneously combine good control of the synthesis and good moulding conditions (lower temperature of the mould, no bubbles, good viscosity, and the like) with good optical properties (transparency) and good mechanical properties (very good flexibility and very good impact strength).

The invention claimed is:

1. A copolymer of polyamide blocks of amide units and polyether blocks of ether units, the polyamide blocks being obtained by polycondensation of monomers comprising an equimolar combination of at least one diamine and of at least one dicarboxylic acid and not including lactam or α,ω-aminocarboxylic acid, the diamine or diamines being greater than 50 weight percent cycloaliphatic diamine or diamines and chosen from the group consisting of bis(3-methyl-4-aminocyclohexyl)methane (BMACM), para-aminodicyclohexylmethane (PACM), isophoronediamine (IPD), bis(4-aminocyclohexyl)methane (BACM), 2,2-bis(3-methyl-4-aminocyclohexyl)propane (BMACP) and 2,6-bis(aminomethyl)-norbornane (BAMN), and the dicarboxylic acid or acids being predominantly linear aliphatic, the respective proportions of monomers of the ether and amide units being chosen so that:

the said copolymer exhibits a high transparency which is such that the transmission at 560 nm through a sheet with a thickness of 2 mm is greater than 75%;

the said copolymer is amorphous or exhibits a crystallinity such that the enthalpy of fusion during the second heating of an ISO DSC (delta Hm(2)) is at most equal to 30 J/g, the weight being with respect to the amount of amide units present or of polyamide present, this melting corresponding to that of the amide units; and said copolymer has a glass transition temperature at least equal to 75° C.

2. A copolymer according to claim 1, wherein a single cycloaliphatic diamine, bis(3-methyl-4-aminocyclohexyl)methane, was used as diamine to produce the amide units.

3. A copolymer according to claim 1, wherein the amide units comprise at least one noncycloaliphatic diamine in a proportion of at most 30 mol % with respect to the diamines of the said amide units.

4. A copolymer according to claim 1, wherein the aliphatic dicarboxylic acid or acids are chosen from aliphatic dicarboxylic acids having from 6 to 36 carbon atoms, selected from the group consisting of 1,10-decanedicarboxylic acid, 1,12-dodecanedicarboxylic acid, 1,14-tetradecanedicarboxylic acid and 1,18-octadecanedicarboxylic acid.

5. A copolymer according to claim 1, wherein the monomers of the amide units comprise at least one nonaliphatic dicarboxylic acid in a proportion of at most 15 mol % with respect to the dicarboxylic acids.

6. A copolymer according to claim 5, wherein the nonaliphatic dicarboxylic acid is an aromatic diacid, selected from isophthalic acid (I), terephthalic acid (T) and their mixtures.

7. A copolymer according to claim 1, wherein the amide units represent 50 to 95% by weight of the said copolymer.

8. A copolymer according to claim 1, wherein said copolymer includes amide units for which the number of carbons per amide is on average at least equal to 9.

9. A copolymer according to claim 1, wherein the polyamide blocks are chosen from BMACM.9, BMACM.10, BMACM.12, BMACM.14, BMACM.18 and their blends or copolymers.

10. A copolymer according to claim 1, wherein the number-average molecular weight of the polyamide blocks is between 500 and 12 000 g/mol.

11. A copolymer according to claim 1, wherein the polyether blocks result from at least one polyalkylene ether polyol.

12. A copolymer according to claim 11, wherein the polyalkylene ether diol is chosen from polyethylene glycol (PEG), polypropylene glycol (PPG), polytrimethylene glycol (PO3G), polytetramethylene glycol (PTMG) and their blends or their copolymers.

13. A copolymer according to claim 1, wherein the polyether blocks comprise polyoxyalkylene sequences comprising $NH_2$ chain ends.

14. A co-polymer according to claim 1, wherein the number-average molecular weight of the polyether blocks is between 200 and 4000 g/mol.

15. A copolymer according to claim 1, wherein the glass transition temperature of the said copolymer is at least equal to 90° C.

16. A copolymer according to claim 1, wherein said copolymer has a crystallinity such that the enthalpy of fusion during the second heating of an ISO DSC (delta Hm(2)) is less than or equal to 10 J/g, the weight being with respect to the amount of amide units present or of polyamide present.

17. A copolymer according to claim 1, wherein said copolymer has a crystallinity such that the enthalpy of fusion during the second heating of an ISO DSC (delta Hm(2)) is between 10 and 30 J/g, the weight being with respect to the amount of amide units present or of polyamide present, this melting corresponding to that of the amide units.

18. A copolymer according to claim 1, wherein said copolymer further comprises at least one additive chosen from heat stabilizers, UV stabilizers, colorants, nucleating agents, plasticizers or agents for improving the impact strength, the said additive or additives preferably having a refractive index similar to that of the said copolymer.

19. A copolymer according to claim 1, which is a copolymer wherein the ether units are flexible, are chosen to be of highly hydrophilic nature, and are selected from the group consisting of polyether block of PEG or its copolymers with PPG or PO3G type nature, which confers antistatic properties and waterproof-breathable properties on the composition, it furthermore being possible for this composition to contain antistatic additives, in order to reinforce the overall antistatic effect, and additives which make it possible to increase the blending compatibility with other polymers, it being possible for the copolymer, alone or with additives, subsequently to be specifically used as additive of another polymer or material in order to confer on it an increase in antistatic or waterproof-breathable properties.

20. A process for the preparation of a copolymer of polyamide blocks of amide units and polyether blocks of ether units, the polyamide blocks being obtained by polycondensation of monomers comprising an equimolar combination of at least one diamine and of at least one dicarboxylic acid and not including lactam or α,ω-aminocarboxylic acid, the diamine or diamines being predominantly cycloaliphatic and the dicarboxylic acid or acids being predominantly linear aliphatic, the respective proportions of monomers of the ether and amide units being chosen so that:

the said copolymer exhibits a high transparency which is such that the transmission at 560 nm through a sheet with a thickness of 2 mm is greater than 75%;

the said copolymer is amorphous or exhibits a crystallinity such that the enthalpy of fusion during the second heating of an ISO DSC (delta Hm(2)) is at most equal to 30 J/g, the weight being with respect to the amount of amide units present or of polyamide present, this melting corresponding to that of the amide units; and the said copolymer has a glass transition temperature at least equal to 75° C., wherein said polycondensation reaction comprises two stages comprising:

preparing in a first stage, the polyamide blocks by polycondensation
of the diamine or diamines;
of the dicarboxylic acid or acids;
in the presence of a chain-limiting agent chosen from dicarboxylic acids; then reacting in a second stage, the polyamide blocks obtained with polyether blocks in the presence of a catalyst.

21. Process for the preparation of a copolymer based on amide units and based on ether units, the amide units being composed predominantly of an equimolar combination of at least one diamine and of at least one dicarboxylic acid and not including lactam or α,ω-aminocarboxylic acid, the diamine or diamines being predominantly cycloaliphatic and the dicarboxylic acid or acids being predominantly linear aliphatic, it being possible for the amide units optionally to comprise, but to a minor extent, at least one other polyamide comonomer, the respective proportions of monomers of the ether and amide units being chosen so that:

the said copolymer exhibits a high transparency which is such that the transmission at 560 nm through a sheet with a thickness of 2 mm is greater than 75%;

the said copolymer is amorphous or exhibits a crystallinity such that the enthalpy of fusion during the second heating of an ISO DSC (delta Hm(2)) is at most equal to 30 J/g, the weight being with respect to the amount of amide units present or of polyamide present, this melting corresponding to that of the amide units; and the said copolymer has a glass transition temperature at least equal to 75° C., the said polymer being provided in the form of polyamide PA-polyether PE blocks, comprising the step of performing a one-stage polycondensation involving the diamine or diamines;

the dicarboxylic acid or acids; and if appropriate, the other polyamide comonomer or comonomers;

wherein said polycondensation occurs:

in the presence of a chain-limiting agent chosen from dicarboxylic acids;

in the presence of the PE blocks; and in the presence of a catalyst for the reaction between the PE (polyether) blocks and the PA blocks.

22. Process according to claim 21, wherein said dicarboxylic acid is introduced in excess with respect to the stoichiometry of the diamine or diamines, and is used as chain-limiting agent.

23. Process according to claim 21, wherein a derivative of a metal chosen from the group formed by titanium, zirconium and hafnium or of strong acid, chosen from the group phosphoric acid, hypophosphorous acid or boric acid, is used as catalyst.

24. Preparation process according to claim 21, wherein the polycondensation is carried out at a temperature of 240 to 280° C.

25. A transparent or translucent shaped article, selected from the group consisting of fibre, fabric, film, sheet, rob, pipe or injection-moulded component, comprising the copolymer of polyamide blocks of amide units and polyether blocks of ether units, the polyamide blocks being obtained by polycondensation of monomers comprising an equimolar combination of at least one diamine and of at least one dicarboxylic acid and not including lactam or $\alpha,\omega$-aminocarboxylic acid, the diamine or diamines being predominantly cycloaliphatic and the dicarboxylic acid or acids being predominantly linear aliphatic, the respective proportions of monomers of the ether and amide units being chosen so that:

the said copolymer exhibits a high transparency which is such that the transmission at 560 nm through a sheet with a thickness of 2 mm is greater than 75%;

the said copolymer is amorphous or exhibits a crystallinity such that the enthalpy of fusion during the second heating of an ISO DSC (delta Hm(2)) is at most equal to 30 J/g, the weight being with respect to the amount of amide units present or of polyamide present, this melting corresponding to that of the amide units; and the said copolymer has a glass transition temperature at least equal to 75° C.

26. A shaped article according to claim 25, wherein said article is selected from the group consisting an item of sports equipment a component of an item of sports equipment, a component of a sports shoe, an item of sports gear, ice skates, ski bindings, rackets, sports bats, boards, horseshoes, flippers, golf balls, a recreational or do-it-yourself article, an item of highway gear or equipment subjected to attacks by the weather and to mechanical assaults, a protective article, helmet visors, glasses or sides of glasses, a motor vehicle component, headlight protectors, rearview mirrors, small components of all-terrain motor vehicles or tanks, components of scooters, components of motorbikes, and components of mopeds.

* * * * *